United States Patent [19]
Burke et al.

[11] Patent Number: 5,975,818
[45] Date of Patent: Nov. 2, 1999

[54] GRATING LIFT PAD

[75] Inventors: Michael K. Burke, Wheaton; Walter J. Peach, Jr., Elgin, both of Ill.

[73] Assignee: Zeftek, Inc., Montgomery, Ill.

[21] Appl. No.: 08/794,651

[22] Filed: Feb. 3, 1997

Related U.S. Application Data

[60] Provisional application No. 60/012,512, Feb. 29, 1996.

[51] Int. Cl.⁶ ........................................................ B60P 7/06
[52] U.S. Cl. .................................. 410/4; 410/30; 248/357
[58] Field of Search .................................... 410/4, 26, 30, 410/80; 248/188.2, 351, 357; 105/355, 404; 296/182

[56] References Cited

U.S. PATENT DOCUMENTS

| | | | |
|---|---|---|---|
| 3,685,460 | 8/1972 | Steele, Jr. et al. | 248/188.2 X |
| 3,784,054 | 1/1974 | Martz | 410/80 X |
| 4,911,590 | 3/1990 | Green | 410/26 |
| 5,302,063 | 4/1994 | Winsor | 410/30 |
| 5,312,213 | 5/1994 | Winsor | 410/4 X |
| 5,636,951 | 6/1997 | Long et al. | 410/80 X |

FOREIGN PATENT DOCUMENTS

| | | | |
|---|---|---|---|
| 828 689 | 1/1952 | Germany | 248/357 |

*Primary Examiner*—Stephen T. Gordon
*Attorney, Agent, or Firm*—Lloyd L. Zickert

[57] ABSTRACT

A grating lift pad for mounting on the free end or edge of a grating section on the floor of an auto rack railroad car which lifts the grating section off the floor to reduce wear and rusting of the floor caused by movement and vibration of the grating during train movement.

13 Claims, 2 Drawing Sheets

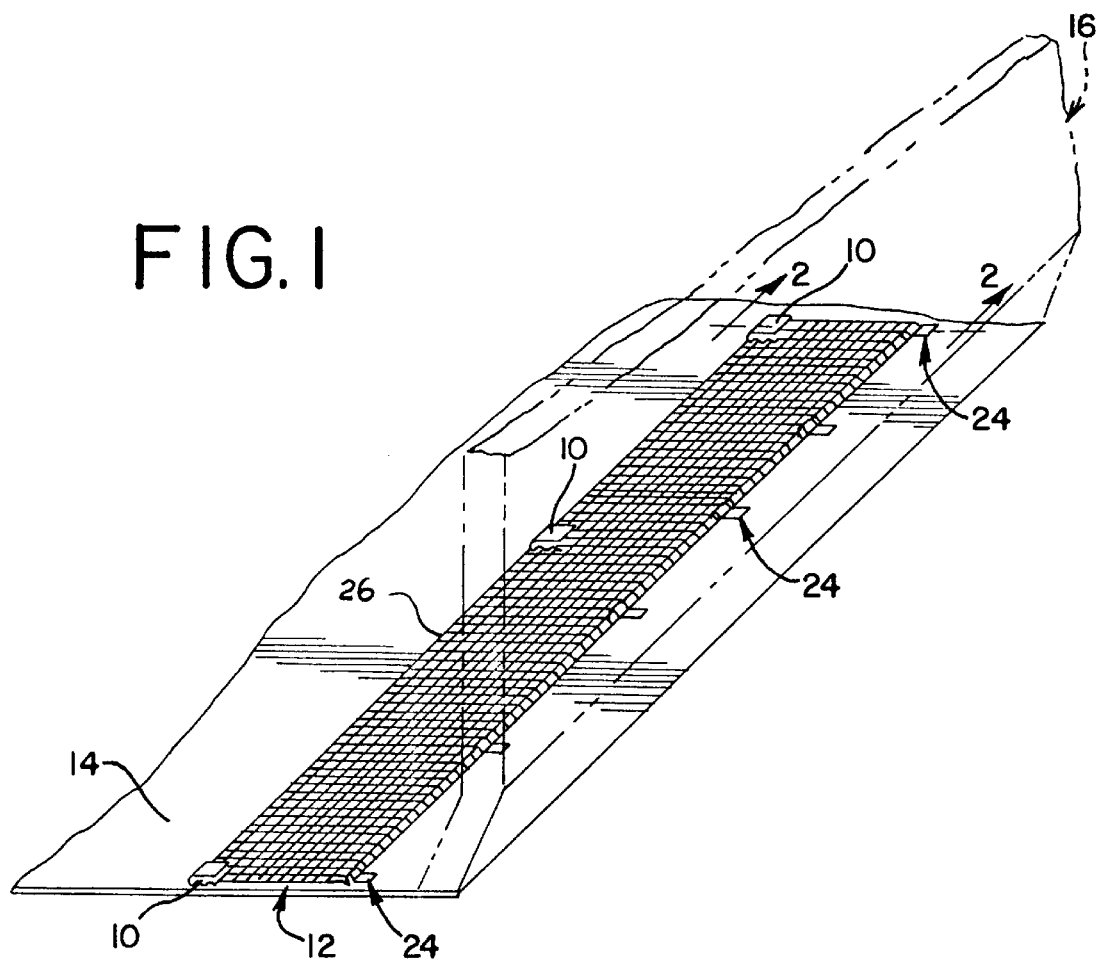
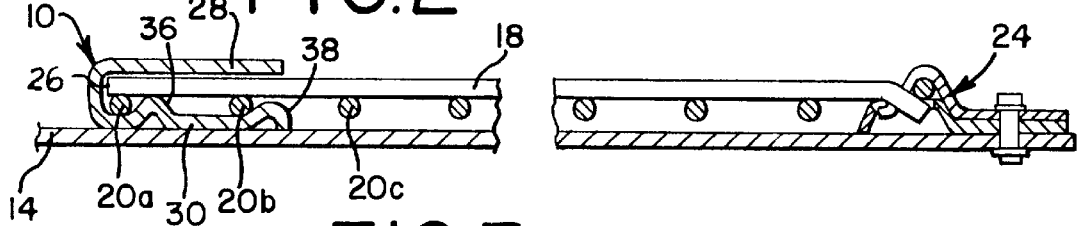
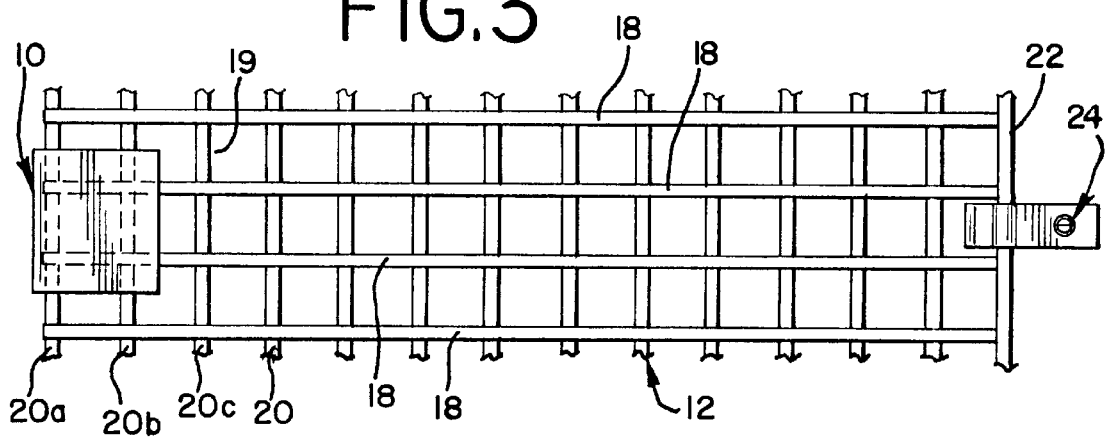

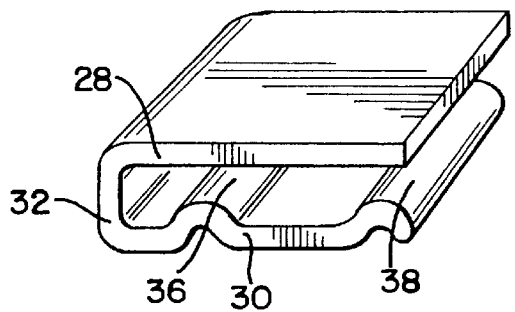
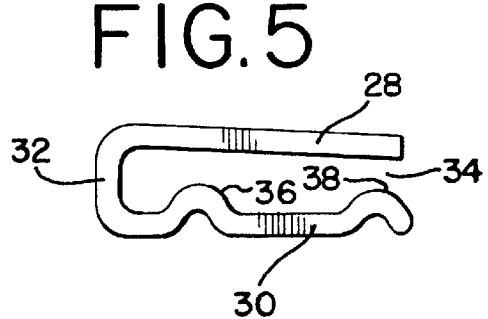
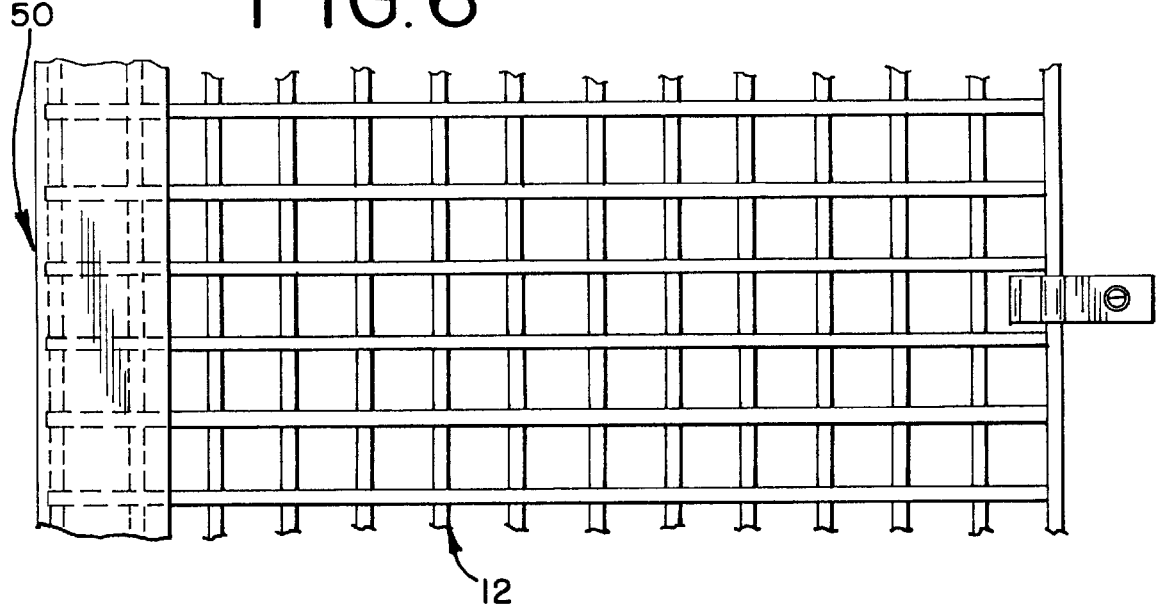

GRATING LIFT PAD

DESCRIPTION

This application is based on our provisional application Serial No. 60/012,512, filed Feb. 29, 1996.

This invention relates in general to a grating lift pad for an auto rack railroad car, and more particularly to a grating lift pad which is attached to the free end of a section of grating in an auto rack railroad car and which lifts the grating section off the floor to substantially eliminate wear and rusting on the floor caused by the movement and vibration of the grating against the floor.

BACKGROUND OF THE INVENTION

Heretofore, it has been common practice to transport newly manufactured vehicles, such as automobiles, vans, and trucks, long distances on auto rack equipped railroad cars, known in the industry as auto rack cars. The typical auto rack car is compartmented, having two or more levels for storing vehicles, opposed side walls, doors in front and back or at each end, and a roof. When in transit, the vehicles are secured in place on the floor on each level of the car to prevent damage which would result from the free movement of the vehicles in the car. Various wheel or tire chocking systems exist for securing the vehicles in place on the floor. The lower floor is constructed of steel plate and coated with a suitable paint, such as a non-skid paint, while the upper floors or decks are usually constructed of galvanized corrugated steel plate.

One system for securing the vehicles in place in double-deck auto rack cars for generally transporting sport utility vehicles, which has been approved by the AAR, and which is currently in use in a large number of cars, is shown in U.S. Pat. No. 5,302,063. This system includes the placement of two spaced-apart substantially parallel rows of steel rod grating extending along the entire length of the floor or upper deck plates on each level of the car. The grating is hingedly connected to the floor, and the tires of the vehicles are positioned on the grating and chocks are adjustably connected to the grating adjacent the tires to prevent the vehicles from moving while in transit. The grating is divided into elongated rectangular ten-foot sections formed of upper and lower crossing circular steel rods interconnected by welding. The lower rods are somewhat undulated to generally mate with the upper bars, thereby defining a large number of contact points (over one thousand) that engage the floor when the grating is laying on the floor. Each grating section is pivotally attached along its entire length to the floor by suitable hinge means at one side and has a free end along its entire length at the other side opposite the hinge means. The bottom and free end of each grating section rests on the floor. The grating sections pivot upwardly about the hinged end to facilitate clearing debris, snow, ice, and other materials which accumulate under the grating.

During transit of the vehicles in the auto rack cars, the grating is loaded and the weight of the vehicles positioned on the grating holds the grating down against the floor and generally prevents movement or vibration of the grating. However, when the auto rack car is empty, the grating is not held down and the movement of the train causes continuous vibration and movement of the grating over the floor. The vibration of the grating sections against the floor at the various contact points will wear away the non-skid paint on the floor or deck or the galvanized coating of the steel corrugated plates and expose the metal surface at those contact points. The exposed metal surfaces are subject to rusting, which is highly disadvantageous in auto rack cars because rusting combined with the contact points of the grating rubbing against the points frees rust particles that become airborne when transporting cars and which can come to rest on and cause damage to the finishes of the vehicles.

In present installations, each car includes fourteen grating sections per deck. Since each grating section has over one thousand floor contact points, there would be over fourteen thousand contact points per deck. Accordingly, there is a need for a device which reduces the wear on the floor caused by the movement and vibration of the grating and thereby reduces rusting at the multitude of contact points where the grating engages the floors of the auto rack cars and thereby minimize, if not eliminate, airborne rust particles.

SUMMARY OF THE INVENTION

The present invention overcomes the above problems in providing a grating lift pad for an auto rack car which lifts the free end of the grating off the floor together with substantially all of the contact points, thereby preventing the movement and vibration of the grating sections from wearing away the non-skid paint on the floor and causing rusting on the floor at the contact points where the grating engages the floor. The grating lift pad of the present invention is easily installed on the grating sections and could additionally prevent the grating sections from freezing to the floor in cold weather. Further, since the grating is usually galvanized, the pad of the invention, by preventing substantially all contact between the grating contact points and the floor when the car is not loaded, prevents any possible wear of the galvanized coating and rusting of the grating.

A plurality of grating lift pads of the present invention are positioned along the length of each grating section, preferably adjacent to each end of the section and centrally therebetween. Each grating lift pad consists of a plastic substantially U-shaped member sized and adapted to be clipped on the free end or edge of the grating opposite the hinged end. The lift pad may be formed from any suitable rust-proof material, such as a substantially rigid extrudable grade Ultra High Molecular Weight Polyethylene (UHMWPE). The pad includes a top plate and a bottom plate integrally connected by a bight portion. The bottom plate includes inner and outer locking ridges for securing the grating lift pad on the grating section. The inner locking ridge is somewhat larger or higher than the outer locking ridge for securely engaging the outermost lower rod or crossbar of the grating. The lift pad is installed on the section by manually pushing the open end of the pad over the upper and lower rods of the grating. A mallet may also be used to drive the lift pad completely onto the grating.

Alternatively, a single elongated lift pad may be formed for placement over the entire length or substantially the entire length of the free end of the grating section.

It should be further appreciated that other lift pad configurations may be provided that raise the grating contact points above the floor out of contact with the floor.

It is therefore an object of the present invention to provide a grating lift pad attachable to the grating in an auto rack car which lifts the grating contact points off the floor to reduce wear and rusting on the floor and/or the grating caused by the movement and vibration of the grating contact points with the floor.

Another object of the present invention is to provide a grating lift pad easily attachable to the grating in an auto rack car which prevents the grating from wearing off the non-skid paint on the floor and exposing the floor's metal surface.

A still further object of the present invention is to provide a grating lift pad attachable to the grating in an auto rack car which prevents the grating from freezing to the floor.

A yet further object of the present invention is to provide a grating lift pad which easily clips or mounts onto the free end of the grating in an auto rack car to prevent wear and rusting on the floor and/or the grating at the contact points where the grating engages the floor.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a fragmentary perspective view of the grating on the inside of an auto rack railroad car and illustrating the grating lift pads of the present invention attached along the length of the free end of grating;

FIG. 2 is an enlarged cross-sectional view of the grating lift pad mounted on the free end of the grating taken substantially along line 2—2 of FIG. 1 and illustrating a hinge at the opposite edge of the grating;

FIG. 3 is an enlarged fragmentary top plan view of the grating lift pad mounted on the grating and illustrating a hinge at the opposite edge of the grating;

FIG. 4 is a perspective view of the grating lift pad;

FIG. 5 is a side elevational view of the grating lift pad; and

FIG. 6 is a top plan view of an alternative embodiment of the grating lift pad of the present invention mounted on the grating.

DESCRIPTION OF THE INVENTION

Referring now to the drawings, and particularly to FIGS. 1–3, the grating lift pad of the present invention, generally indicated by numeral 10, is shown mounted on a section of grating 12 on the floor 14 inside of a typical auto rack car 16. The floor on each level of the auto rack car has two spaced-apart parallel rows of grating extending along its entire length for adjustably attaching chocks to hold a vehicle in place against movement forces generated by movement of the car. Each row of grating is divided into rectangular ten foot sections and is formed of circular upper and lower steel rods 18 and 20, respectively. As above mentioned, this grating/chock system is used in double-deck cars for transporting sport utility vehicles, wherein seven grating sections are hingedly connected to the car floor at each side to provide fourteen sections per floor. The rods cross each other at substantially right angles and are interconnected by welding at the crossing points. The lower rods 20 take a generally undulated form to mate with the upper rods and extend substantially longitudinally and parallel to the length of the car and the upper rods 18 extend substantially transverse to the length of the car. A plurality of substantially square openings 19 in the grating 12 are thus formed by the upper and lower rods 18 and 20. While the rods and pattern may be of any suitable size and type, the upper rods are about 0.250 inches (6.35 mm) in diameter, the lower rods are about 0.310 inches (7.87 mm) in diameter, and the spacing between rod center lines is about 1.5 inches (3.8 cm). Further, by virtue of the undulated form of the lower rods, a large number of floor contact points, over one thousand, are defined on the underside of each grating section which when in contact with the floor can wear and rub under movement over the floor, particularly when the grating section is unloaded, and thereby cause wear and rusting of the floor and/or the grating.

As shown in FIGS. 2 and 3, and in greater detail in U.S. Pat. No. 5,302,063, a hinge bar 22 extends longitudinally along the length of the grating 12 and is pivotally attached to the floor 14 by a series of suitably spaced-apart hinge members 24. The other side of the grating 12 is a free end or edge at the outermost longitudinal rod 20a which could rest on the floor at various contact points if the grating lift pad of the present invention is not installed. In actual installations, the hinging is provided by a substantially continuous hinge. This construction allows the grating section 12 to pivot upwardly about the attached hinge bar 22. Being connected at only one side subjects the grating to movement and vibration when the weight of the vehicles are not holding the free end of the grating on the floor.

To solve this problem, a plurality of grating lift pads 10 of the present invention are mounted along the free end or edge at the longitudinal rods opposite the hinged side of the grating section While any number of pads may be used, three are illustrated, one being adjacent to each end of the grating section 12 and one centrally therebetween to substantially evenly lift the grating section 12 off the floor 14. The grating lift pad is preferably formed from a substantially rigid black extrudable grade ultra high molecular weight polyethylene (UHMWPE), or any other suitable non-rusting material capable of absorbing high impact forces, such as a high-impact polypropylene, or possibly a urethane material. The lift pad is preferably extruded from UHMWPE, although it may be molded or otherwise suitably formed.

Referring also to FIGS. 4 and 5, the lift pad 10 is substantially U-shaped and includes a top plate 28 which engages the upper transverse rods 18 and a bottom plate 30 which engages the lower longitudinal rods 20. The top and bottom plates 28 and 30 are integrally connected by a bight portion 32 which is opposite an open end 34 of the lift pad. The top and bottom plates 28 and 30 are preferably extruded in a resting position slightly bent toward each other, as specifically shown in FIG. 5, so as to assist the gripping of the grating when mounted. Although the lift pad 10 is substantially rigid, it is at least somewhat flexible such that when mounted, the top and bottom plates 28 and 30 will separate for mounting and ultimately be substantially parallel to each other. The top and bottom plates are thus inclined to return to their natural resting position which serves to maintain the lift pad on the free end of the grating.

The bottom plate 30 also includes integrally formed substantially semi-circular in cross section inner and outer locking ridges 36 and 38, respectively. The locking ridges 36 and 38 extend into the spaces between the lower rods 20a and 20b, and 20b and 20c, respectively, to securely lock the lift pad 10 onto the grating 12, as specifically illustrated in FIG. 2. The inner locking ridge 36 is slightly higher and extends closer to the bottom surface of the top plate 28 than the outer locking ridge 38 to facilitate more positive attachment to the outermost lower rod 20a at the free end of the grating.

When installing the lift pad 10 on the free end 26 of the grating 12, the open end 34 is first manually placed over the upper and lower rods and the outer locking ridge 36 is pushed between lower rods 20a and 20b. A mallet may then be used to strike against the bight portion 32 to force the inner locking ridge 36 over the rod 20a as in FIG. 2. The inner locking ridge 36 rests between rods 20a and 20b, and the outer locking ridge rests between rods 20b and 20c to lock the lift pad in place. The pad is preferably about 3 inches (7.6 cm) wide, although it may be wider or narrower if desired. The wall thickness is preferably about 0.188 inches (4.78 mm), but may be thicker or thinner if desired. Further, the spacing between the top and bottom plates and the position of the locking ridges is such as to properly fit snugly on the grating to retain the pad in place throughout all possible conditions of use.

Once installed, the grating lift pad 10 lifts the grating approximately one-quarter inch off the floor of the auto rack car which prevents the contact points on the lower rods 20 from directly contacting the floor 14. Additionally, by lifting the grating off the floor, the grating lift pad prevents the grating from freezing to the floor, and the galvanized coating on the grating from wearing off to allow the grating to rust. Although the disposition of the grating section to the floor is shown to be substantially parallel in FIG. 2, it may be somewhat inclined downwardly toward the hinged side in an actual installation where the hinge disposes the hinged edge of the grating more directly at the floor. It should be further appreciated that loading the grating will cause the area under a vehicle wheel to engage the floor, while the unloaded area will remain spaced from the floor. Usually, four vehicles are loaded on each deck, and therefore eight wheels will be along each row of seven grating sections. Then, the lifting pad of the invention will still cause a substantial amount of the contact points of each grating section to be spaced from the floor. Further, loading substantially eliminates movement of the grating, but any movement could only affect the limited area of contact under the wheels.

Referring now to FIG. 6, an alternative embodiment of the grating lift pad of the present invention, generally indicated by numeral 50, is illustrated as mounted on free end of the grating 12. The lift pad 50 is a considerably longer section than the lift pad 10 and extends substantially along the entire length of the free end of the grating. The lift pad 50 is formed and works exactly like lift pad 10, except that it covers significantly more of the lower rods than the lift pad 10.

Moreover, it should be appreciated that the lifting pads of the invention could be configured differently than illustrated while also spacing the contact points of the grating above the floor. For example, the lower plate could be fastened in place on the underside of the grating section by using plastic button fasteners extending through the lower plate and the upper plate disposed on the top side of the section. Further, the plates may have any desired polygonal cross section.

While the underside of the pad of FIGS. 1 to 5 is shown to include grooves as would be formed in an extrusion, it should be appreciated the underside could be completely planar and without grooves if desired.

From the foregoing, it will be appreciated the grating lift pad of the invention solves the rust problem inherent in the grating of the system for securing vehicles in place in auto rack cars as identified in the above mentioned patent.

It will be understood that modifications and variations may be effected without departing from the scope of the novel concepts of the present invention, and it is understood that this application is to be limited only by the scope of the appended claims.

We claim:

1. A grating lift pad in combination with a grating in an auto rack railroad car for eliminating wear and rust on the floor, said grating including longitudinal and transverse connected rods pivotally attached along one side to the floor and having a free end along its opposite side, and said grating lift pad being mounted on said free end and including a substantially U-shaped rust-proof body having interconnected top and bottom plates over said free end of said grating, and means on at least one of said top and bottom plates projecting toward the other of said plates and locking said grating lift pad onto said free end of said grating, whereby said grating lift pad lifts the grating off the floor to prevent the free end of the grating from contacting the floor and causing wear and rusting of the floor.

2. The combination of claim 1, wherein the locking means of said grating lift pad includes at least one locking ridge on the side of the bottom plate which engages one of the longitudinal rods of the free end of the grating to lock the grating lift pad on the grating.

3. The combination of claim 1, wherein the locking means includes inner and outer locking ridges on the side of the bottom plate facing the top plate which engages at least two of the longitudinal rods adjacent the free end of the grating to lock the grating lift pad on the grating.

4. The combination of claim 1, wherein the bottom plate has a substantially planar bottom surface.

5. The combination of claim 1, wherein the body is extruded from an ultra high molecular weight polyethylene.

6. The combination of claim 1, wherein the top and bottom plates are substantially parallel when mounted on the free end of the grating.

7. The combination of claim 1, wherein the body is elongated and extends substantially along the entire free end of the grating.

8. The combination of claim 1, wherein a plurality of spaced apart ones of said lift pads are provided on the free edge of the grating.

9. The combination of claim 1, wherein a plurality of ones of said lift pads are provided along the free end of the grating.

10. A grating lift pad for lifting a grating off the floor in an auto rack railroad car to eliminate wear and rust on the floor, wherein said grating includes longitudinal and transverse connected rods pivotally attached along one side to the floor and having a free end along its opposite side, said grating lift pad comprising a substantially U-shaped rust-proof body having interconnected top and bottom members, and means on at least one of said top and bottom members for locking said grating lift pad onto said free end of said grating, said top and bottom members being in the form of top and bottom plates, said locking means including inner and outer locking ridges on the bottom plate which engage at least two of the longitudinal rods of the free end of the grating to lock the grating lift pad on the grating, said inner locking ridge extending from the bottom plate closer to the top plate than the outer locking ridge to facilitate positive attachment to the outermost longitudinal rod of the free end of the grating, whereby said grating lift pad lifts the grating off the floor to prevent the free end of the grating from contacting the floor and causing wear and rusting of the floor.

11. A grating lift pad for lifting a grating off the floor in an auto rack railroad car to eliminate wear and rust on the floor, wherein said grating includes longitudinal and transverse connected rods pivotally attached along one side to the floor and having a free end along its opposite side, said grating lift pad comprising a substantially U-shaped rust-proof body having interconnected top and bottom members, and means on at least one of said top and bottom members for locking said grating lift pad onto said free end of said grating, said top and bottom members being in the form of top and bottom plates, said locking means including inner and outer locking ridges on the bottom plate which engage at least two of the longitudinal rods of the free end of the grating to lock the grating lift pad on the grating, said locking ridges being semi-circular and extending into the spaces between the longitudinal rods of the free end of the grating, whereby said grating lift pad lifts the grating off the floor to prevent the free end of the grating from contacting the floor and causing wear and rusting of the floor.

12. A grating lift pad for lifting a grating off the floor in an auto rack railroad car to eliminate wear and rust on the floor, wherein said grating includes longitudinal and transverse connected rods pivotally attached along one side to the floor and having a free end along its opposite side, said grating lift pad comprising a substantially U-shaped rust-proof body having interconnected top and bottom members, and means on at least one of said top and bottom members for locking said grating lift pad onto said free end of said grating, said top and bottom members being in the form of top and bottom plates, said top and bottom plates being substantially parallel when mounted on the free end of the grating and being biased toward each other prior to mounting on the free end of the grating and having a tendency to return to their natural position which serves to maintain the grating lift pad on the free end of the grating, whereby said grating lift pad lifts the grating off the floor to prevent the free end of the grating from contacting the floor and causing wear and rusting of the floor.

13. A grating lift pad in combination with a grating member of a wheel chocking system for restraining road vehicles being transported in a transport vehicle, said transport vehicle having a longitudinal axis and a floor on which said grating member is mounted and to which a wheel chock can be removably attached, said grating member extending along said longitudinal axis and being pivotally attached to the floor along one edge and having an opposed free edge, said grating lift pad being mountable on the free edge of said grating member to space the free edge above the floor and comprising:

a U-shaped body of plastic, said body having an upper arm overlying said grating member, and a lower arm underlying the grating member and engaging the floor, and said arms being biased toward each other for retaining the lift pad on the grating member and including means for locking the grating lift pad to said grating member.

* * * * *